Patented May 2, 1939

2,156,887

UNITED STATES PATENT OFFICE

2,156,887

DYESTUFFS OF THE ANTHRAQUINONE SERIES

Claus Weinand, Leverkusen I. G. Werk, Germany, assignor to General Aniline Works, Inc., New York, N. Y., a corporation of Delaware No Drawing. Application September 15, 1936, Serial No. 100,874. In Germany September 21, 1935

3 Claims. (Cl. 260—374)

The present invention relates to new dyestuffs of the anthraquinone series and to a process of preparing same.

The new dyestuffs which are obtainable in accordance with my present invention are the products of the interaction of 2 mols of a 1-amino-4-halogenanthraquinone-2-sulfonic acid with 1 mol of an amine selected from the group consisting of diaminodiphenylmethanes and diaminotriphenylmethanes. Preferably such diaminodiphenylmethanes are employed wherein the amino groups are in p,p'-position; the hydrogen atoms of the methane carbon atom may be substituted by alkyl radicals, such as methyl groups. Among the diaminotriphenylmethanes likewise those compounds are preferred which contain the amino groups in p,p'-positions.

The new dyestuffs are soluble in water with a blue to bluish-green coloration and dye wool from an acid bath blue to bluish-green shades. They are distinguished by their excellent fastness properties, particularly towards acids.

My new dyestuffs can be prepared by causing 2 mols of a 1-amino-4-halogenanthraquinone-2-sulfonic acid, preferably of the bromo compound, to react upon 1 mol of a diamino compound of the character described. The reaction must be performed in an aqueous alcoholic medium as otherwise only 1 mol of the 1-amino-4-halogenanthraquinone-2-sulfonic acid would react per each 1 mol of the diamino compound. As acid binding agents I preferably add sodium carbonate or sodium bicarbonate. The addition of catalysts, such as of a cupric or cuprous salt may have an accelerating action upon the reaction.

The following examples illustrate the invention the parts being by weight:

Example 1

20 parts of 1-amino-4-bromoanthraquinone-2-sulfonic acid are heated to boiling while refluxing in 300 parts of water and
100 parts of ethylalcohol in admixture with
20 parts of p,p'-diaminodiphenylmethane,
10 parts of soda and
1 part of cuprous bromide.

The solution quickly turns dark blue. When cooling the condensation product precipitates and is isolated in the usual manner.

Example 2

20 parts of 1-amino-4-bromoanthraquinone-2-sulfonic acid are heated to boiling in 300 parts of water and
100 parts of methylalcohol in admixture with
20 parts of p,p'-diaminodiphenylcyclohexane,
20 parts of soda and
1 part of copper sulfate until the first yellow-red solution has turned greenish-blue. During the reaction the dyestuff precipitates in blue needles which are isolated in the usual manner.

Example 3

40 parts of 1-amino-4-bromoanthraquinone-2-sulfonic acid are heated to boiling in 400 parts of water and
100 parts of ethylalcohol in admixture with
10 parts of p,p'-diaminodiphenyldimethylmethane,
40 parts of soda and
3 parts of cuprous chloride until the solution has turned dark blue. When cooling the dyestuff precipitates in blue needles, which are isolated in the usual manner.

If the 10 parts of p,p'-diaminodiphenyldimethylmethane are substituted by 12 parts of p,p'-diaminotriphenylmethane a dyestuff of similar shades is obtained.

I claim:
1. The product of the reaction of 2 mols of a 1-amino-4-halogenanthraquinone-2-sulfonic acid and 1 mol of a p,p'-diaminodiphenylmethane in which both hydrogen atoms of the methanecarbon atom are substituted by a radical selected from the group consisting of alkyl and alkylene, said alkylene radicals being joined to form a six-membered ring.
2. The product of the reaction of 2 mols of a 1-amino-4-halogenanthraquinone-2-sulfonic acid and 1 mol of p,p'-diaminodiphenyldimethylmethane.
3. The product of the reaction of 2 mols of a 1-amino-4-halogenanthraquinone-2-sulfonic acid and 1 mol of p,p'-diaminodiphenylcyclohexane.

CLAUS WEINAND.